(12) United States Patent
Harry

(10) Patent No.: US 12,085,251 B2
(45) Date of Patent: Sep. 10, 2024

(54) REFLECTIVE SUBSTRATE FOR VEHICLE LIGHTING ALERT

(71) Applicant: Lenora Harry, Summerville, SC (US)

(72) Inventor: Lenora Harry, Summerville, SC (US)

( * ) Notice: Subject to any disclaimer, the term of this patent is extended or adjusted under 35 U.S.C. 154(b) by 0 days.

(21) Appl. No.: 17/529,593

(22) Filed: Nov. 18, 2021

(65) Prior Publication Data

US 2023/0151940 A1    May 18, 2023

(51) Int. Cl.
*F21S 41/32* (2018.01)
*F21S 41/39* (2018.01)
*F21S 43/31* (2018.01)
*F21S 43/37* (2018.01)

(52) U.S. Cl.
CPC .............. *F21S 41/32* (2018.01); *F21S 41/39* (2018.01); *F21S 43/31* (2018.01); *F21S 43/37* (2018.01)

(58) Field of Classification Search
CPC .. F21S 41/32; F21S 41/39; F21S 43/31; F21S 43/37; G08B 5/004
See application file for complete search history.

(56) References Cited

U.S. PATENT DOCUMENTS

| | | | |
|---|---|---|---|
| 4,457,089 A * | 7/1984 | Phillips, Jr. ............. | G09F 13/22 40/544 |
| 5,223,312 A * | 6/1993 | Langille ................... | B60Q 1/30 359/530 |
| 2006/0077679 A1 * | 4/2006 | McAnally ................ | B60Q 1/30 362/540 |
| 2008/0055725 A1 * | 3/2008 | Dornbos .............. | B60Q 1/2615 359/546 |
| 2009/0097234 A1 * | 4/2009 | von Malm ........... | B60Q 1/2696 362/296.07 |
| 2012/0280528 A1 * | 11/2012 | Dellock ................. | B60Q 1/323 362/516 |
| 2015/0023046 A1 * | 1/2015 | Shido ...................... | F21S 43/26 362/543 |
| 2018/0180260 A1 * | 6/2018 | Chikama .............. | B60Q 1/2607 |
| 2021/0102685 A1 * | 4/2021 | Allen ....................... | F21V 7/30 |
| 2022/0048444 A1 * | 2/2022 | Mayer Pujadas ...... | B60Q 1/301 |

* cited by examiner

*Primary Examiner* — Zheng Song
(74) *Attorney, Agent, or Firm* — The Iwashko Law Firm, PLLC; Lev Ivan Gabriel Iwashko

(57) ABSTRACT

A reflective substrate removably connected to at least a portion of at least one of a headlight and a tail light of a vehicle, the reflective substrate including a main body, including a reflective layer disposed on at least a portion of a first side of the main body to reflect an external light illuminated thereon and away therefrom in at least one angular direction toward at least one of a side, a top, and a bottom of the vehicle, and a transparent layer disposed on at least a portion of a second side of the main body opposite with respect to the first side to pass a beam of light from at least one of the headlight and the tail light through the transparent layer to the reflective layer, and a vehicle fastener disposed on at least a portion of the main body to removably connect the main body to at least one of the headlight and the tail light.

7 Claims, 3 Drawing Sheets

REFLECTIVE SUBSTRATE FOR VEHICLE LIGHTING ALERT

BACKGROUND

1. Field

The present general inventive concept relates generally to a reflector, and particularly, to a reflective substrate.

2. Description of the Related Art

Driving at night and/or under low light conditions can be a serious challenge for many people, especially for people who are sensitive to light. Illuminated headlights from oncoming traffic, flashing brake lights, and/or flashing turn signals are often reported as problematic triggers, which can leave a driver struggling to keep eyes on the road. Moreover, some lights that are too bright for the driver can result in a migraine attack, a headache, and/or other health related problems that may affect the driver's ability to operate a vehicle.

Currently, there are not many options for the driver to alert an oncoming driver of high beams. The driver may flash the vehicle high beams to the oncoming driver as a means to alert the oncoming driver, but this can exacerbate the problem by creating the same problem for the oncoming driver.

Therefore, there is a need for a reflective substrate to disperse lights away from a field of view from the driver.

SUMMARY

The present general inventive concept provides a reflective substrate.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a reflective substrate removably connected to at least a portion of at least one of a headlight and a tail light of a vehicle, the reflective substrate including a main body, including a reflective layer disposed on at least a portion of a first side of the main body to reflect an external light illuminated thereon and away therefrom in at least one angular direction toward at least one of a side, a top, and a bottom of the vehicle, and a transparent layer disposed on at least a portion of a second side of the main body opposite with respect to the first side to pass a beam of light from at least one of the headlight and the tail light through the transparent layer to the reflective layer, and a vehicle fastener disposed on at least a portion of the main body to removably connect the main body to at least one of the headlight and the tail light.

The main body may at least partially deform in response to an application of force thereto.

The main body may be constructed as a one-way mirror.

The reflective layer may turn opaque in response to receiving the external light illuminated thereon.

The reflective layer may adjust the at least one angular direction of the external light that is reflected based on a distance of an oncoming vehicle from the vehicle.

The reflective layer may reflect the external light toward the side of the vehicle while the external light of an oncoming vehicle illuminates the reflective layer and the oncoming vehicle is a first predetermined distance from the vehicle, and reflects the external light toward the a windshield of the oncoming vehicle while the external light of the oncoming vehicle illuminates the reflective layer and the oncoming vehicle is a second predetermined distance from the vehicle.

The reflective layer may include a plurality of angled surfaces having different angles of planar surfaces with respect to each other.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

List of Components
Reflective Substrate 100
Main Body 110
Reflective Layer 111
Transparent Layer 112
Vehicle Fastener 120

Figure 1A:
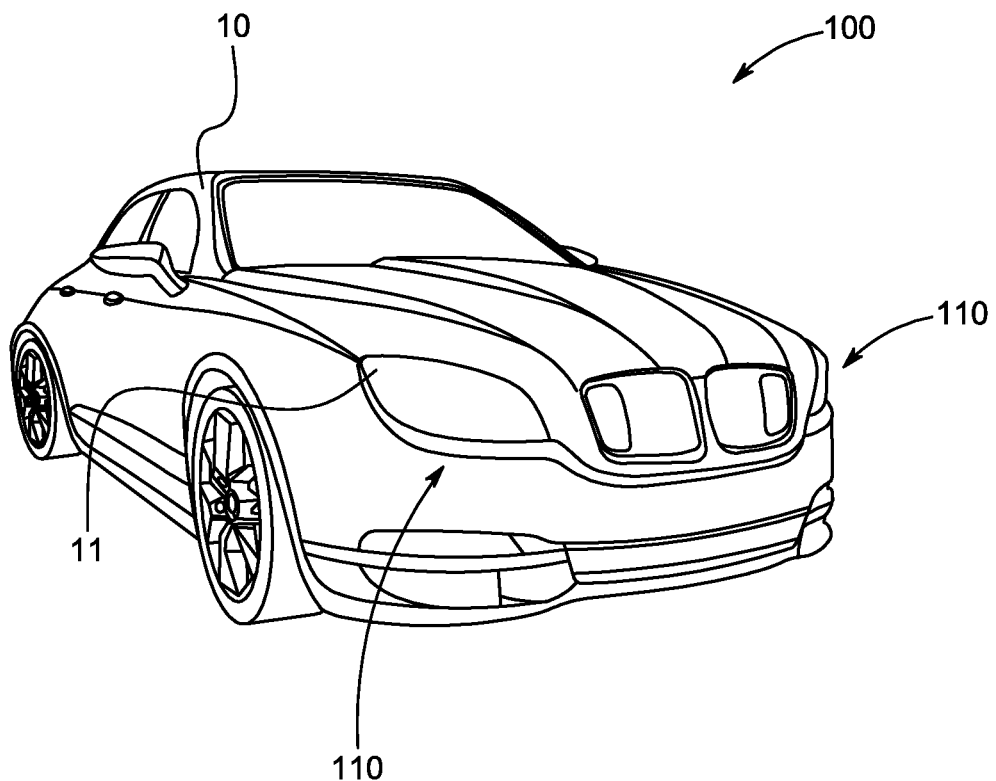
FIG. 1A illustrates a perspective view of a reflective substrate as disposed on a headlight of a vehicle, according to an exemplary embodiment of the present general inventive concept.

FIG. 1A illustrates a perspective view of a reflective substrate 100 as disposed on a headlight 11 of a vehicle 10, according to an exemplary embodiment of the present general inventive concept.

Figure 1B:
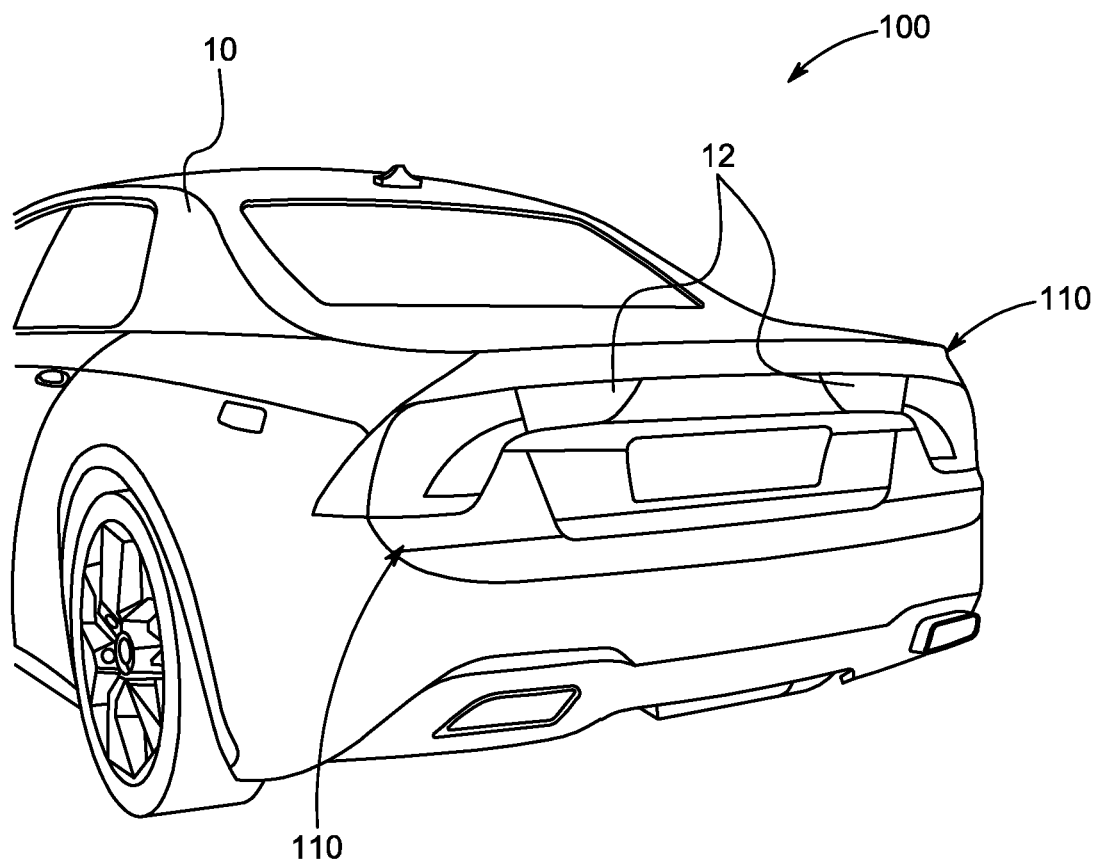
FIG. 1B illustrates a perspective view of the reflective substrate as disposed on a tail light of the vehicle, according to an exemplary embodiment of the present general inventive concept.

FIG. 1B illustrates a perspective view of the reflective substrate 100 as disposed on a tail light 12 of the vehicle 10, according to an exemplary embodiment of the present general inventive concept.

Figure 2:
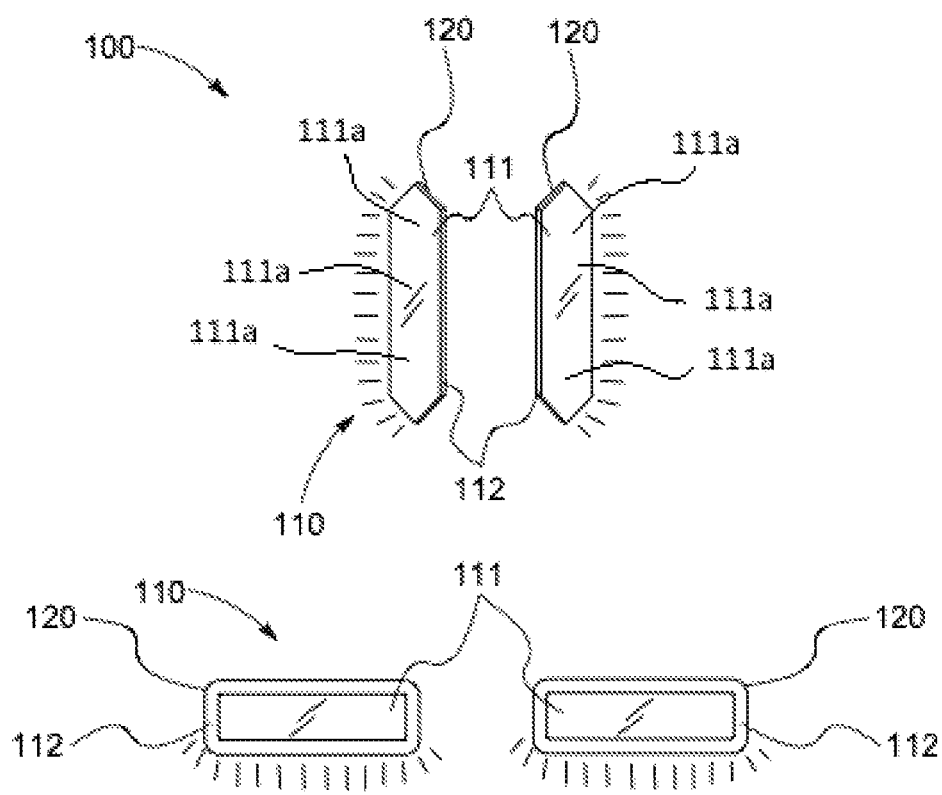
FIG. 2 illustrates a front view of the reflective substrate, according to an exemplary embodiment of the present general inventive concept.

FIG. 2 illustrates a front view of the reflective substrate 100, according to an exemplary embodiment of the present general inventive concept.

The reflective substrate 100 may be constructed from at least one of metal, plastic, glass, and rubber, etc., but is not limited thereto. Also, the reflective substrate 100 may be highly durable and resistant to damage.

The reflective substrate 100 may include a main body 110 and a vehicle fastener 120, but is not limited thereto.

The main body 110 may have a predetermined and/or a fixed shape and/or size based on a shape and/or a size of a headlight 11 and/or a tail light 12 of a vehicle 10. For example, the main body 110 may have a size and/or a shape corresponding to the size and/or the shape of the headlight 11 and/or the tail light 12 of the vehicle 10. Alternatively, the main body 110 may be flexible, such that the main body 110 may at least partially deform (i.e., bend, stretch, expand) in response to an application of force thereto, such as fitting the headlight 11 and/or the tail light 12. The main body 110 may be removably connected to at least a portion of the headlight 11 and/or the tail light 12 of the vehicle 10. As such, the main body 110 may cover at least a portion of the headlight 11 and/or the tail light 12.

The main body 110 may include a reflective layer 111 and a transparent layer 112, but is not limited thereto.

The main body 110 may be constructed as a one-way mirror. More specifically, the reflective layer 111 may be a thin semi-transparent layer of metal to reflect light on an outer surface thereof. Also, the reflective layer 111 may be a first side of the main body 110. The reflective layer 111 may comprise a plurality of angled surfaces 111a, such that each of the plurality of angled surfaces 111a have different angles of planar surfaces with respect to each other. Each of the plurality of angled surfaces 111a of the reflective layer 111 may be configured and/or designed, such that the reflective layer 111 may reflect and/or disperse an external light illuminated thereon and/or away therefrom in at least one angular direction in response to receiving the external light, such as a side, a top, and/or a bottom of the vehicle 10.

Alternatively, the reflective layer 111 may become opaque in response to receiving the external light illuminated thereon, such as a headlight, a high beam, a brake light. Additionally, the reflective layer 111 may adjust the at least one angular direction of the external light that is reflected and/or dispersed based on a distance of an oncoming vehicle from the vehicle 10. For example, the reflective layer 111 may reflect the external light toward the side of the vehicle 10 while the external light of the oncoming vehicle illuminates the reflective layer 111 and the oncoming vehicle is a first predetermined distance from the vehicle 10 (e.g., twenty feet, thirty feet), and reflect the external light toward the headlight and/or a windshield of the oncoming vehicle while the external light of the oncoming vehicle illuminates the reflective layer 111 and the oncoming vehicle is a second predetermined distance from the vehicle 10 (e.g., five feet, ten feet). As such, the reflective layer 111 may alert a driver of the oncoming vehicle of that high beams are active and should be turned off.

Furthermore, the reflective layer 111 may use each of the plurality of angled surfaces 111a to reflect and/or disperse the external light as different colors, such as red in response to the oncoming vehicle being within the second predetermined distance, and blue in response to the oncoming vehicle being within the first predetermined distance.

The transparent layer 112 may be disposed on at least a portion of the reflective layer 111 (i.e., a second side of the main body 110 opposite with respect to the first side). The transparent layer 112 may facilitate movement of a beam of light from the headlight 11 and/or the tail light 12 through the transparent layer 112 to the reflective layer 111 (i.e., from an inner surface to the outer surface of the main body 110). In other words, the transparent layer 112 may only allow light to move from the headlight 11 and/or the tail light 12, such that a beam of light from the headlight 11 and/or the tail light 12 moves through the transparent layer 112. However, the reflective layer 111 may prevent the external light from the oncoming vehicle to move through into the transparent layer 112. As such, the main body 110 may be considered a one-way mirror.

The vehicle fastener 120 may include an adhesive (e.g., tape, glue), a screw, a nail, a bolt, a washer, a nut, a cord, a rope, a strong, a wire, a clamp, a clasp, a magnet, and/or any combination thereof, but is not limited thereto.

The vehicle fastener 120 may be disposed on at least a portion of the transparent layer 112. The vehicle fastener 120 may removably connect the main body 110 to the headlight 11 and/or the tail light 12 of the vehicle 10.

Therefore, the reflective substrate 100 may prevent the external light from reaching eyes of a driver of the vehicle 10. Also, the reflective substrate 100 may reflect the external light toward the oncoming vehicle to notify the oncoming vehicle that high beams need to be turned off.

The present general inventive concept may include a reflective substrate 100 removably connected to at least a portion of at least one of a headlight 11 and a tail light 12 of a vehicle 10, the reflective substrate 100 including a main body 110, including a reflective layer 111 disposed on at least a portion of a first side of the main body 110 to reflect an external light illuminated thereon and away therefrom in at least one angular direction toward at least one of a side, a top, and a bottom of the vehicle 10, and a transparent layer 112 disposed on at least a portion of a second side of the main body 110 opposite with respect to the first side to pass a beam of light from at least one of the headlight 11 and the tail light 12 through the transparent layer 112 to the reflective layer 111, and a vehicle fastener 120 disposed on at least a portion of the main body 110 to removably connect the main body 110 to at least one of the headlight 11 and the tail light 12.

The main body 110 may at least partially deform in response to an application of force thereto.

The main body 110 may be constructed as a one-way mirror.

The reflective layer 111 may turn opaque in response to receiving the external light illuminated thereon.

The reflective layer 111 may adjust the at least one angular direction of the external light that is reflected based on a distance of an oncoming vehicle from the vehicle 10.

The reflective layer 111 may reflect the external light toward the side of the vehicle 10 while the external light of an oncoming vehicle illuminates the reflective layer 111 and the oncoming vehicle is a first predetermined distance from the vehicle 10, and reflects the external light toward the a windshield of the oncoming vehicle while the external light of the oncoming vehicle illuminates the reflective layer and the oncoming vehicle is a second predetermined distance from the vehicle 10.

The reflective layer 111 may include a plurality of angled surfaces 111a having different angles of planar surfaces with respect to each other.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A reflective substrate removably connected to at least a portion of at least one of a headlight and a tail light of a vehicle, the reflective substrate comprising:
 a main body, comprising:
  a reflective layer disposed on at least a portion of a first side of the main body to reflect an external light illuminated thereon and away therefrom in at least one angular direction toward at least one of a side, a top, and a bottom of the vehicle, and
  a transparent layer disposed on at least a portion of a second side of the main body opposite with respect to the first side to pass a beam of light from at least one of the headlight and the tail light through the transparent layer to the reflective layer; and
 a vehicle fastener disposed on at least a portion of the main body to removably connect the main body to at least one of the headlight and the tail light.

2. The reflective substrate of claim 1, wherein the main body at least partially deforms in response to an application of force thereto.

3. The reflective substrate of claim 1, wherein the main body is constructed as a one-way mirror.

4. The reflective substrate of claim 1, wherein the reflective layer turns opaque in response to receiving the external light illuminated thereon.

5. The reflective substrate of claim 1, wherein the reflective layer adjusts the at least one angular direction of the external light that is reflected based on a distance of an oncoming vehicle from the vehicle.

6. The reflective substrate of claim 1, wherein the reflective layer reflects the external light toward the side of the vehicle while the external light of an oncoming vehicle illuminates the reflective layer and the oncoming vehicle is a first predetermined distance from the vehicle, and reflects the external light toward a windshield of the oncoming vehicle while the external light of the oncoming vehicle illuminates the reflective layer and the oncoming vehicle is a second predetermined distance from the vehicle.

7. The reflective substrate of claim 1, wherein the reflective layer comprises:
 a plurality of angled having different angles of planar surfaces with respect to each other.

* * * * *